A. J. KLEBERG.
DENTAL MIRROR AND ATTACHMENT THEREFOR.
APPLICATION FILED MAR. 3, 1908.
911,659.
Patented Feb. 9, 1909.
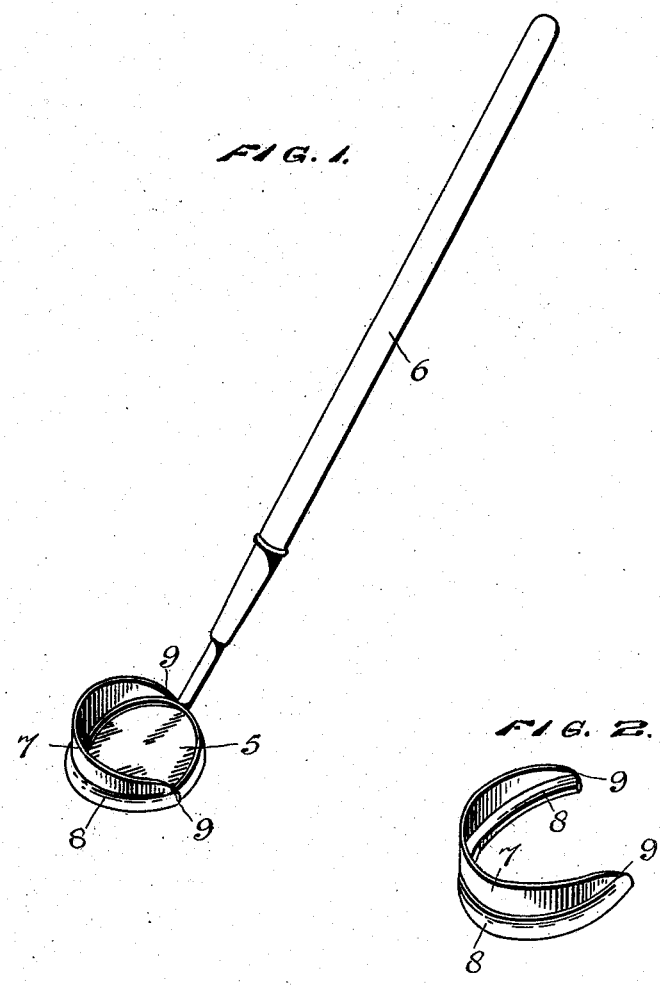
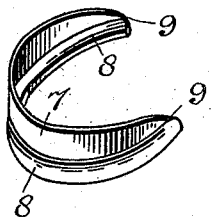
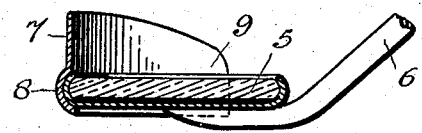
WITNESSES
Chas. K. Davies
Myron H. Clea
INVENTOR
August J. Kleberg
By C. L. Parker
Attorney

UNITED STATES PATENT OFFICE.

AUGUST J. KLEBERG, OF WASHINGTON, DISTRICT OF COLUMBIA.

DENTAL MIRROR AND ATTACHMENT THEREFOR.

No. 911,659.　　　　　Specification of Letters Patent.　　　　Patented Feb. 9, 1909.

Application filed March 3, 1908. Serial No. 419,038.

*To all whom it may concern:*

Be it known that I, AUGUST J. KLEBERG, a citizen of the United States, residing at Washington, District of Columbia, have invented certain new and useful Improvements in Dental Mirrors and Attachments Therefor, of which the following is a specification.

My invention resides in a dental mirror having an upstanding flange extending upon its edge and partially therearound, which flange tapers to relatively narrow ends and which is detachable from said mirror and composed of spring material in order to maintain its engagement therewith and whereby it may be moved about the said mirror.

My invention further and specifically resides in the following features of construction, combination and arrangement which will be hereinafter described with reference to the accompanying drawing, forming a part of the specification, in which like numerals are used to designate like parts throughout the several figures and in which—

Figure 1 is a perspective view of a dental mirror provided with my improved gold saving attachment connected therewith. Fig. 2 is a perspective view of my improved gold saving attachment removed, and Fig. 3 is a sectional view taken through the dental mirror and my improved gold saving attachment connected therewith.

In the practical embodiment of my invention I provide a dental mirror comprising a circular mirror section 5 and a handle 6 extending upwardly therefrom together with a curved strip 7 of spring material adapted to extend for approximately two-thirds the distance around the said mirror section 5 and provided with a depressed channel 8 extending longitudinally along the lower edge of said strip adapted to engage the circular edge of the mirror 5 to clamp the same by virtue of the spring properties of said strip 7. When engaged with the circular edge of the mirror 5, the strip 7 forms an upstanding flange which may be shifted around said mirror edge as desired and which tapers to relatively narrow ends 9 which tapered ends together with the space therebetween allow of an unobstructed view of the tooth being drilled.

In the practical operation of my invention the products of the drilling operation are caught and held by the upstanding flange of the mirror 5, inasmuch as the said mirror in its use is ordinarily held at an angle and inasmuch as the said flange formed by the strip 7 may be shifted around the edge of said mirror to locate its central and widest portion directly in the path of the said products.

Having fully described my invention I claim:

1. A dental mirror having an upstanding flange extending partially therearound and movable thereon, substantially as described.

2. A dental mirror having an upstanding flange extending partially therearound and movable thereon, said flange tapering to relatively narrow ends, substantially as described.

3. An attachment for dental mirrors comprising a curved spring strip tapering toward its ends and having a longitudinal depressed channel for engagement with the edge of said mirror partially therearound to allow said strip to be shifted therearound without displacement, substantially as described.

4. An attachment for dental mirrors, comprising a curved spring strip adapted for engagement with the edge of said mirror partially therearound, substantially as described.

In testimony whereof I affix my signature in presence of two witnesses.

AUGUST J. KLEBERG.

Witnesses:
　MILBURN J. DONOHOE,
　WARREN F. DONOHOE.